United States Patent [19]
Guillory et al.

[11] Patent Number: 5,521,674
[45] Date of Patent: May 28, 1996

[54] SYSTEM AND METHOD FOR CONTROLLING A PRINTER DEVICE

[75] Inventors: Douglas M. Guillory; Michael B. Lloyd, both of Boise, Id.

[73] Assignee: Hewlett-Packard Company, Palo Alto, Calif.

[21] Appl. No.: 518,094

[22] Filed: Aug. 22, 1995

[51] Int. Cl.$^6$ .................................................. G03G 15/00
[52] U.S. Cl. ............................................ 355/200; 355/208
[58] Field of Search ...................................... 355/200–202, 355/203, 208, 210, 308; 235/462, 494; 358/452, 453

[56] References Cited

U.S. PATENT DOCUMENTS 4,876,571  10/1989  Nakamura et al. .................. 355/210

OTHER PUBLICATIONS

"Apple Joins The Fray With New Color LaserWriter 12/600 PS", Hard Copy Observer, vol. V, No. 7, Jul. 1995, p. 51.

*Primary Examiner*—William J. Royer

[57] ABSTRACT

A system and method for controlling image transfer device operations through use of a medium marking material on the image transfer medium being printed. The medium marking material is coded on the paper and sensed by the transfer device to control operations. The medium marking material is visible and/or legible to an operator prior to printing, but becomes invisible during or after printing operations. Responsive to the marking material sensed, a marking signal is produced and translated to a command signal recognized by the printer for controlling printer operations. Heat generated by the printing process causes the marking material to become virtually indistinguishable from the paper during/after printer operations.

16 Claims, 2 Drawing Sheets

SYSTEM AND METHOD FOR CONTROLLING A PRINTER DEVICE

FIELD OF THE INVENTION

This invention relates in general to image transfer technology and, more specifically, to controlling printer device operations.

BACKGROUND OF THE INVENTION

In printer device technology, printer operation control commands are generally either hard coded into the printer, directly programmed into the printer, and/or down loaded (programmed) into the printer from a remotely connected computer system. In the case of hard coding, the functional variations are generally specific and limited. In the case of directly programming the printer, the operator (user) must know the printer specific control commands and/or must follow a menu format for programming the specific commands. In the case of down loading commands to the printer, the operator generally controls the printer through specific application programs, or must know specific details about how to program the printer through the down loadable commands.

Although improvements are constantly being made in applications programs to simplify the use of printers, none of the aforementioned methods provides a truly user simplistic method for controlling a printer. Namely, in each of the identified methods, the user must know something about the printer, its control commands, or the application program being used to control the printer. It would be desirable, therefore, to provide a completely user friendly method for controlling a printer wherein the user needn't know any specific printer commands and needn't follow any manual entry menu system for controlling the printer.

Accordingly, objects of the present invention are to provide a new and improved system and method for providing a simple, user friendly means for controlling operations of a printer or other image transfer device.

SUMMARY OF THE INVENTION

According to principles of the present invention in a preferred embodiment, a method and system provide for controlling image transfer device (printer) operations through use of a medium marking material on the image transfer medium (paper) being printed. More specifically, a disappearing medium marking material coded on the paper is sensed by the printer to control printing operations. The medium marking material is visible and/or legible to an operator prior to printing, but becomes invisible during or after printing operations.

Responsive to the coded marking material sensed, a marking signal is produced and translated to a command signal recognized by the printer for controlling printer operations. Furthermore, heat generated by the printing process causes the marking material to become virtually indistinguishable from the paper during printer operations.

Advantageously, a printer operator (user) need not know any specific printer commands, but may simply use the encoded paper for controlling printer operations, such as configuring the printer for the specific medium being used. The medium marking material may also be used to instruct the operator regarding loading of the paper, orientation, or the like.

Other objects, advantages, and capabilities of the present invention will become more apparent as the description proceeds.

DETAILED DESCRIPTION OF THE INVENTION

Although the present invention is described in terms of general printer technology, it is obvious to one of ordinary skill in the art that the present invention is equally applicable to other similar forms of image transfer technology (for example, photocopying, facsimile, etc.). Accordingly, rather than describe all variations of image transfer technology herein, this discussion will be limited to printer terminology but with rights in the invention being limited only by the claims relative to image transfer technology in general.

Figure 1:
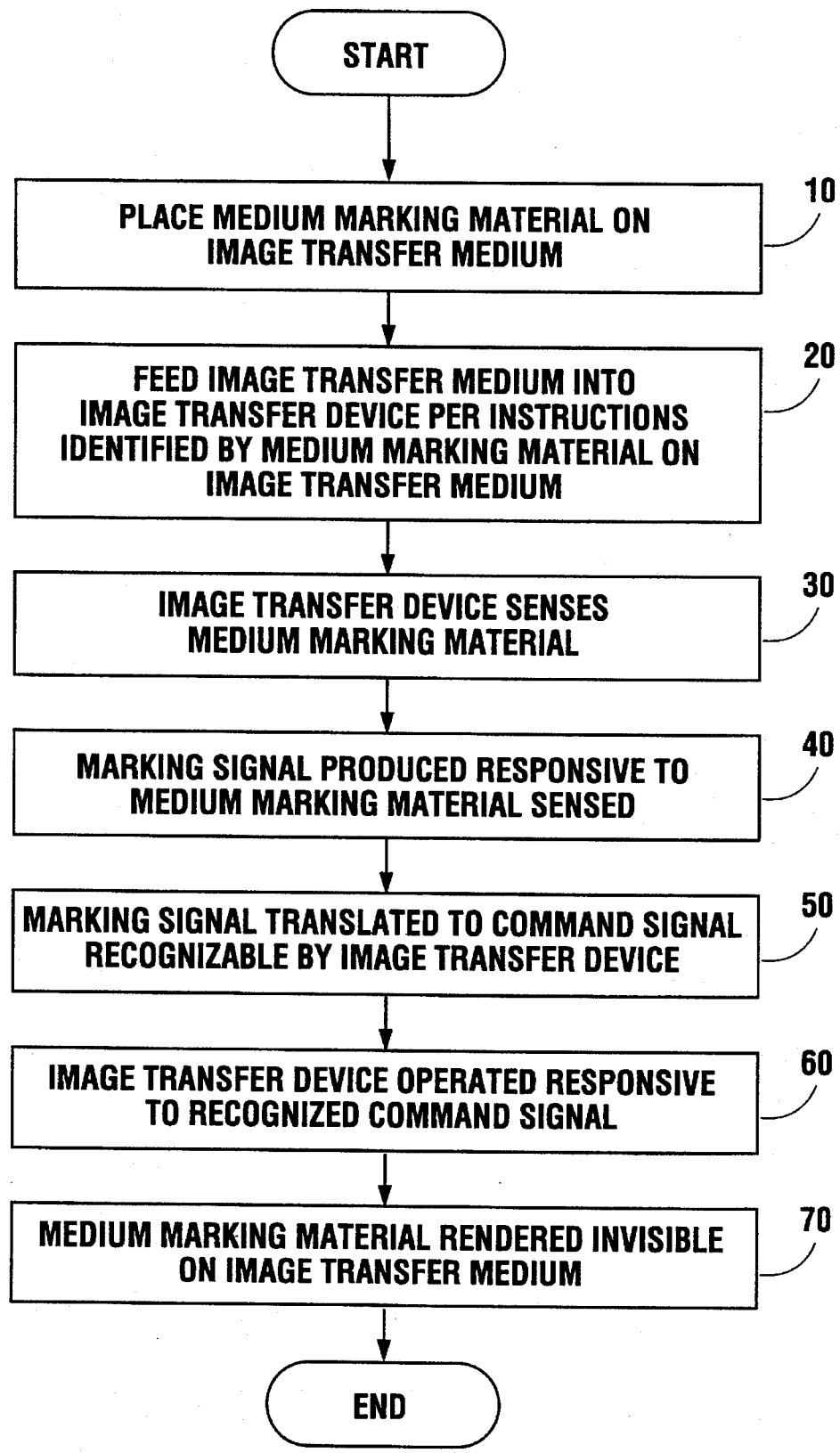
FIG. 1 is a flow chart depicting the present invention method of controlling operations of an image transfer device by using a medium marking material on an image transfer medium passed through the device.

Given the forgoing, FIG. 1 is a flow chart depicting the present invention method of controlling operations of an image transfer device (printer) by using a medium marking material on an image transfer medium passed through the device. Although the image transfer medium is typically a paper product, such as a sheet of paper, cardstock, or the like, the principles of the present invention are equally applicable to other image transfer media, such as plastic, transparencies, or the like. However, for ease of discussion purposes, and rather than referencing all possible variations of image transfer media herein, paper will be referred to as the image transfer medium in this disclosure.

First, a medium marking material is disposed on 10, or as part of, an image transfer medium (i.e., a sheet of paper). The medium marking material is a conventional marking material, such as ink, or may be a distinguishable material embedded within (as part of) the paper itself. The marking material retains a "disappearing" characteristic, as well known in the art for certain media marking materials, whereby during or after processing (printing) of the paper, the marking material becomes virtually indistinguishable (visibly) from the paper itself, from thermal fusing, drying, chemical reaction, or the like. However, a "disappearing" characteristic is only a preferred option. For example, other marking characteristics, such as distinguishably visible features formed in conventional bonded paper, also provide a satisfactory means necessary for accomplishing the purposes of the present invention. In either case, the marking material may be disposed on the paper when the paper is originally manufactured, or through conventional printing operations subsequent to original manufacturing. The manner of placement of the marking material isn't crucial to the present invention, so long as the marking material is retained by the paper such that it can be sensed by the printer as described further herein.

Similarly, the location of the marking material on the paper isn't crucial to the present invention, so long as it coordinates with a sensing means in the printer for being sensed as described further herein.

Next, 20, the paper marked with the marking material is fed into the printer as conventionally occurs in image transfer operations. However, in a preferred embodiment, the marking material is legible to the user prior to printing to allow communications, instructions, or the like, to be written on the paper for the user. This feature allows the user to know before feeding the paper into the printer, for example, how the printer will be operated responsive to the marking material, or how the paper should be fed into the printer (i.e., orientation: which side up, or which is the leading edge; and loading: which paper tray), or how the printer will be configured responsive to the type and features of the paper or other medium being used, or any other communication necessary for enhanced user friendly printer operations.

Subsequently, 30, the printer senses the medium marking material on the paper. The sensing occurs by conventional image sensing technology as described further herein.

Then, a marking signal is produced 40 responsive to the marking material sensed, and translated to a printer command signal 50. The command signal is simply a signal that is interpreted by the printer for controlling printing operations. If the command signal is valid, printing operations are properly controlled. If the command signal is not valid (for example, due to incorrect marking of the marking material or other error), an error signal results for which printing operations respond accordingly.

The next step is for the printer to respond to the printer command signal produced 60. Namely, printer operations are controlled responsive to the command signal produced from the interpreted marking material on the paper. Since the marking material may be placed on the paper in any coded fashion, numerous printer commands may be identifiable therefrom. For example, if the marking material is encoded on the paper in a fashion similar to conventional bar coding (and scanning) technology, the number of distinguishably encoded commands is virtually limitless. As such, it will be obvious to one of ordinary skill in the art that most any printer operation may be controlled according to this method of the present invention. Accordingly, suffice it to be noted that the command signal (or signals) generated need only correlate to given printer commands.

Finally, 70, after printer operations are controlled the marking material is rendered virtually "invisible" on the paper. This occurs at any time during or after printing. In a preferred embodiment, heat generated by the printer causes the marking material to become virtually indistinguishable from the paper. Conventional fusing (in a laser printer) or drying (in an ink jet type printer) generates the heat necessary for rendering the marking material invisible. This provides for a clean, final document, leaving no remnants of the marking material.

Figure 2:
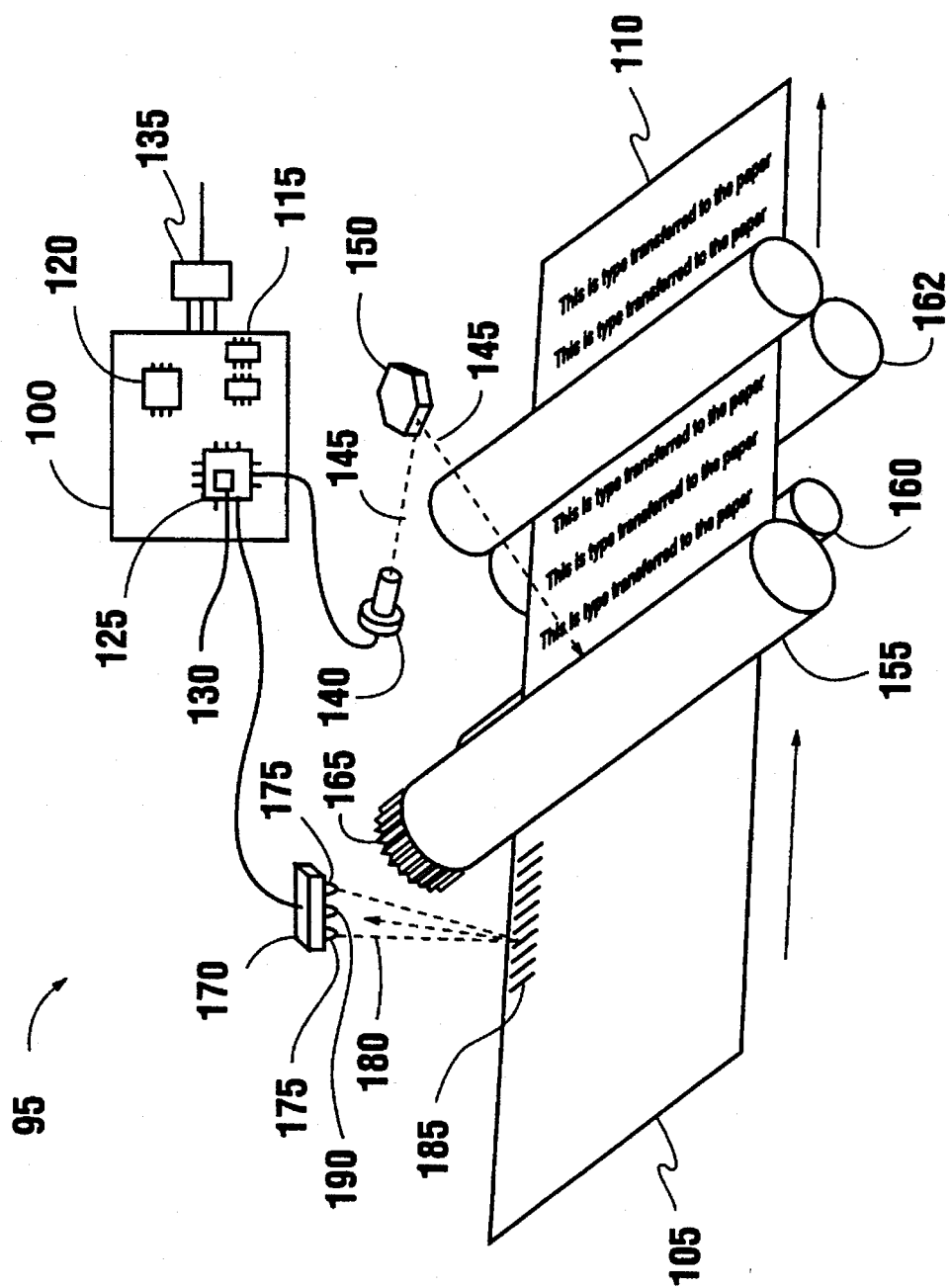
FIG. 2 is a schematic block diagram of the present invention system for controlling operations of an image transfer device responsive to a medium marking material sensed on an image transfer medium passed through device.

FIG. 2 is a schematic block diagram of the present invention system for controlling operations of an image transfer device 95 responsive to a medium marking material 185 sensed on an image transfer medium 105 that is passed through the device. Although image transfer device 95 is a laser printer in this diagram, it is obvious that the present invention is equally applicable to other image transfer technology as previously discussed.

Printed circuit assembly (PCA) 100 embodies the general formatter electronics for printing an image to paper 105 and 110. Namely, PCA 100 includes memory 115, such as Random Access Memory (RAM), for holding an image to be printed, microprocessor 120 for processing the image to be printed, general circuitry 125, translation circuitry 130, and input/output (I/O) interface 135 for connecting PCA 100 to separate computing components. Translation circuitry 130 is shown as a separate component from general circuitry 125 for ease of discussion purposes only. However, as conventional in the art, it is obvious that it may be combined or embodied in general ASIC circuitry 125, or kept separate if so desired.

PCA 100 communicates with laser diode 140 which emits laser beam 145. Laser beam 145 is reflected off of rotating scanning mirror 150 and onto drum 155. Drum 155 is a photoconductive, electrically charged drum for holding an image to be transferred (printed) to transfer roller 160 and subsequently onto paper 105 and 110. Gear drive 165 is connected to drum 155 and meshes with other gear drive components (not shown) of the laser printer for rotating drum 155. Fuser rollers 162 fuse the transferred image to the paper.

Although photoconductive drum 155 is shown, it is obvious that a continuous, photoconductive belt (not shown) or other medium of transfer, photoconductive or not, could just as easily be used in place of drum 155. For example, if the present invention were employed with ink jet printer technology, a non photoconductive drum surface may be used.

Sensor 170 is any conventional optical sensor in the art capable of sensing medium marking material 185. In a preferred embodiment, sensor 170 includes light source 175 which directs a light 180 upon medium marking material 185. Medium marking material 185 is placed on (or as part of) paper 105 in a coded form representative of a command or commands for controlling printer system 95. Material 185 is also placed correlative with sensor 170 for sensing of the commands encoded for controlling the printer.

Light 180 is reflected off of paper 105 and marking material 185 back to photosensor 190. Photosensor 190 is, preferably, a reflective photosensor, although a transmission type photosensor, phototransistor, photodiode or other light detection device will function similarly. Upon detection of light 180 reflected from paper 105 and marking material 185, photosensor 190 generates a marking signal (current) indicative of the light detected as reflected off of paper 105 and marking material 185. The marking signal is transmitted to translation circuitry 130. In the present invention, translation circuitry 130 is embodied in general circuitry 125 of PCA 100 (i.e., circuitry 125 is an ASIC), but could just as well be separate. The translation circuitry is engineered by conventional means in the art and translates the marking signal to a printer command signal for controlling printer operations.

Finally, paper 110 shows how the medium marking material is rendered non visible during and/or after printing operations. Namely, paper 110 represents a paper at the end of the printing process. Paper 110 had been previously marked with a medium marking material (similar to that shown at 185 on paper 105), the marking material had controlled the printer operations when sensed by the printer, the paper has proceeded through the printing process, and the marking material is now, subsequently, rendered virtually indistinguishable from paper 110. In a preferred embodiment, heat from the fusing operations (fusing rollers 162) has caused the marking material to become indistinguishable from the paper.

What has been described above are the preferred embodiments for a system and method of controlling printer operations by use of a disappearing medium marking material. It will be obvious that the present invention is easily implemented utilizing any of a variety of hardware and/or software existing in the art. Furthermore, while the present invention has been described by reference to specific embodiments, it will be obvious that other alternative embodiments and methods of implementation or modification may be employed without departing from the true spirit and scope of the invention.

What is claimed is:

1. A method of controlling operations of an image transfer device through use of a medium marking material on an image transfer medium used in connection with the image transfer device, the method comprising:
   (a) sensing the medium marking material on the image transfer medium, for producing a marking signal;
   (b) operating the image transfer device responsive to the marking signal; and,
   (c) rendering the medium marking material virtually indistinguishable from the image transfer medium.

2. The method of claim 1 further including translating the marking signal to a command signal recognizable by the image transfer device for operating the image transfer device.

3. The method of claim 1 wherein the image transfer device is a printer, photocopier, or facsimile device.

4. The method of claim 1 wherein the image transfer medium is paper or plastic.

5. The method of claim 1 wherein the medium marking material is a visible material on the image transfer medium prior to operating the image transfer device.

6. The method of claim 5 wherein at least a portion of the visible material is legible to an operator of the image transfer device prior to operating the image transfer device.

7. The method of claim 5 wherein the medium marking material is rendered indistinguishable from the image transfer medium at some point in time during or after operation of the image transfer device responsive to the image transfer medium.

8. The method of claim 7 wherein heat within the image transfer device causes the medium marking material to become indistinguishable from the image transfer medium.

9. The method of claim 1 wherein the medium marking material is disposed on or as part of the image transfer medium in a coded manner for operating the image transfer device.

10. A method of controlling operations of a printer device through use of a temperature reactive marking material on a medium to be printed in the printer, the method comprising:
    (a) marking the medium with the marking material;
    (b) feeding the medium to the printer for printing per instructions identified by the marking material on the medium;
    (c) sensing the marking material on the medium and producing a marking signal;
    (d) operating the printer responsive to the marking signal; and,
    (e) causing the marking material to become non visible on the medium.

11. A system for controlling operations of an image transfer device, comprising:
    (a) means for sensing a medium marking material on an image transfer medium used in the image transfer device;
    (b) means for producing a marking signal responsive to the sensed medium marking material; and,
    (c) means for operating the image transfer device responsive to the marking signal.

12. The system of claim 11 further including means for translating the marking signal to a command signal recognizable by the image transfer device for operating the image transfer device.

13. The system of claim 11 wherein the image transfer device is a printer, photocopier, or facsimile device.

14. The system of claim 11 wherein the image transfer medium is paper or plastic.

15. The system of claim 11 wherein the medium marking material is a visible material on the image transfer medium prior to operating the image transfer device.

16. The system of claim 15 wherein the medium marking material becomes non visible at some point in time during or after operation of the image transfer device responsive to the image transfer medium.

* * * * *